United States Patent
Regonini

[19]

[11] Patent Number: 6,050,521
[45] Date of Patent: Apr. 18, 2000

[54] RELEASABLE COUPLING FOR A HELICOPTER TAIL ROTOR POWER TRANSMISSION LINE

[75] Inventor: Roberto Regonini, Somma Lombardo, Italy

[73] Assignee: Finmeccanica S.p.A, Italy

[21] Appl. No.: 09/124,188

[22] Filed: Jul. 28, 1998

[30] Foreign Application Priority Data

Aug. 1, 1997 [IT] Italy .................................. TO97A0710

[51] Int. Cl.[7] ................................................ B64C 27/00
[52] U.S. Cl. ........................ 244/60; 244/17.11; 244/120; 464/154; 464/901
[58] Field of Search ............................. 244/17.11, 17.19, 244/17.21, 120, 60, 49; 464/140, 154, 160, 162, 179, 182, 901; 403/383, 359, 300, 304, 11, 23, 325; 192/66, 70.15, 107 R

[56] References Cited

U.S. PATENT DOCUMENTS

| | | | |
|---|---|---|---|
| 3,016,721 | 1/1962 | Davis ....................................... | 464/169 |
| 3,116,896 | 1/1964 | Sigler et al. .......................... | 244/17.21 |
| 3,185,409 | 5/1965 | Jacobsen ................................. | 244/120 |
| 3,981,158 | 9/1976 | Watson . | |
| 4,560,300 | 12/1985 | Vollmer et al. .......................... | 464/169 |
| 4,913,681 | 4/1990 | Green ....................................... | 464/169 |
| 5,186,573 | 2/1993 | Flotow .................................... | 464/901 |
| 5,360,476 | 11/1994 | Baldino . | |

FOREIGN PATENT DOCUMENTS 2 727 483   5/1996   France .

*Primary Examiner*—Galen L. Barefoot
*Attorney, Agent, or Firm*—Liniak Berenato Longacre & White

[57] ABSTRACT

A releasable coupling for a power transmission line to a tail rotor of a foldable-tail-section helicopter, the coupling having a first and a second coupling assembly fitted respectively to the body and the tail of the helicopter, and which cooperate with each other when the tail is in the work position; the two coupling assemblies having respective transmission members in turn having respective radial toothings cooperating telescopically with each other, and respective conical male and female lead-in members which are brought into contact with each other prior to the respective toothings to guide connection of the transmission members; at least one of the transmission members being supported orientably.

10 Claims, 3 Drawing Sheets

RELEASABLE COUPLING FOR A HELICOPTER TAIL ROTOR POWER TRANSMISSION LINE

BACKGROUND OF THE INVENTION

The present invention relates to a releasable coupling for a power transmission line from a main transmission to the tail rotor of a helicopter.

Some helicopters comprise a tail section which is foldable substantially 180° alongside the body to reduce the size of the helicopter, for example, when loading it onto a ship.

For the tail section to be folded, a releasable coupling must obviously be provided along the transmission line connecting the main transmission of the helicopter to the tail rotor.

Known couplings substantially comprise a pair of coupling assemblies fitted respectively to the body and tail section, and having respective transmission members connected angularly to the main transmission and tail rotor respectively. The two transmission members comprise respective saw-toothed face gears, which mesh when the tail section is in the work position to restore continuity of the power transmission line between the main transmission and the tail rotor.

Known couplings of the type briefly described above involve several drawbacks.

In particular, certain operating conditions (e.g. rough landing with no torque on the tail rotor, or torque inversion) may result in instantaneous release of the transmission members, so that torque is cut off along the power transmission line to the tail rotor.

Moreover, the face gears call for accurate alignment of the respective transmission members, which is difficult to achieve on account of the coupling assemblies being fitted to the structure of the helicopter, so that the dimensional accuracy achievable is fairly poor.

SUMMARY OF THE INVENTION

It is an object of the present invention to provide a releasable coupling for a power transmission line to the tail rotor of a foldable-tail-section helicopter, designed to eliminate the aforementioned drawbacks typically associated with known couplings.

According to the present invention, there is provided a releasable coupling for a power transmission line to a tail rotor of a helicopter having a body and a tail section movable, with respect to said body, between a work position and a folded position; said coupling comprising a first coupling assembly fitted to said body of the helicopter and connected to a first portion of said transmission line, and a second coupling assembly fitted to said tail section of the helicopter and connected to a second portion of said transmission line; the two coupling assemblies cooperating with each other when said tail section is in said work position, being released when said tail section is in said folded position, and comprising respective transmission members having respective teeth meshing with each other in said work position of said tail section; characterized in that said teeth of said transmission members are radial and cooperate telescopically with each other; said coupling comprising orientable supporting means for at least one of said transmission members; and said coupling assemblies comprising lead-in means which are brought into contact with each other prior to the respective teeth to guide connection of the transmission members.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 4:
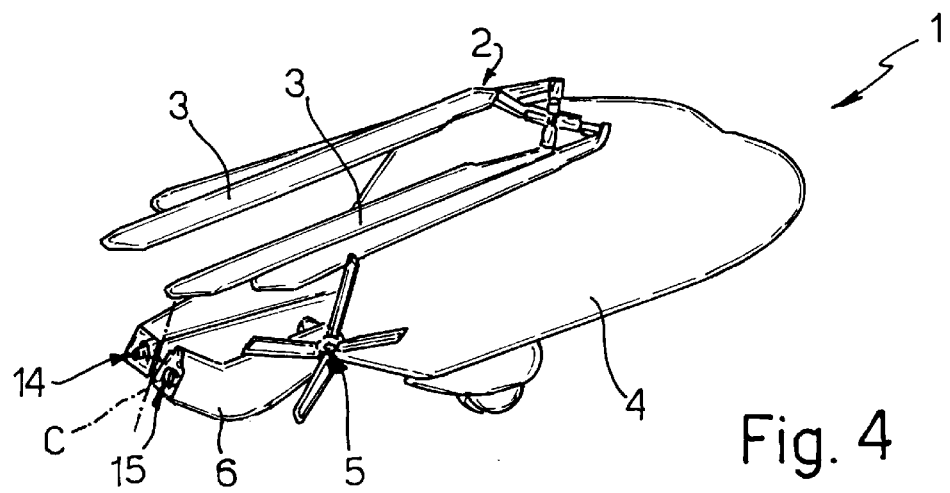
FIG. 4 shows a schematic view in perspective of a foldable-tail-section helicopter equipped with a releasable coupling in accordance with the present invention.

Number 1 in FIG. 4 indicates as a whole a helicopter comprising a main rotor 2 with blades 3 foldable along the body 4 of the helicopter; and a tail rotor 5 carried by a tail section 6 foldable with respect to body 4.

In particular, tail section 6 is hinged to body 4 about a lateral axis C inclined forwards and upwards with respect to the vertical (FIG. 1) so that, when folded, tail section 6 extends laterally downwards with respect to body 4.

Tail rotor 5 is connected to a main transmission (not shown) by a transmission line 7 (shown partly in FIG. 1) defined by a first portion 7a of axis A housed in body 4, and by a second portion 7b of axis B housed in tail section 6; axes A and B being coincident when tail section 6 is in the work position.

Figure 1:
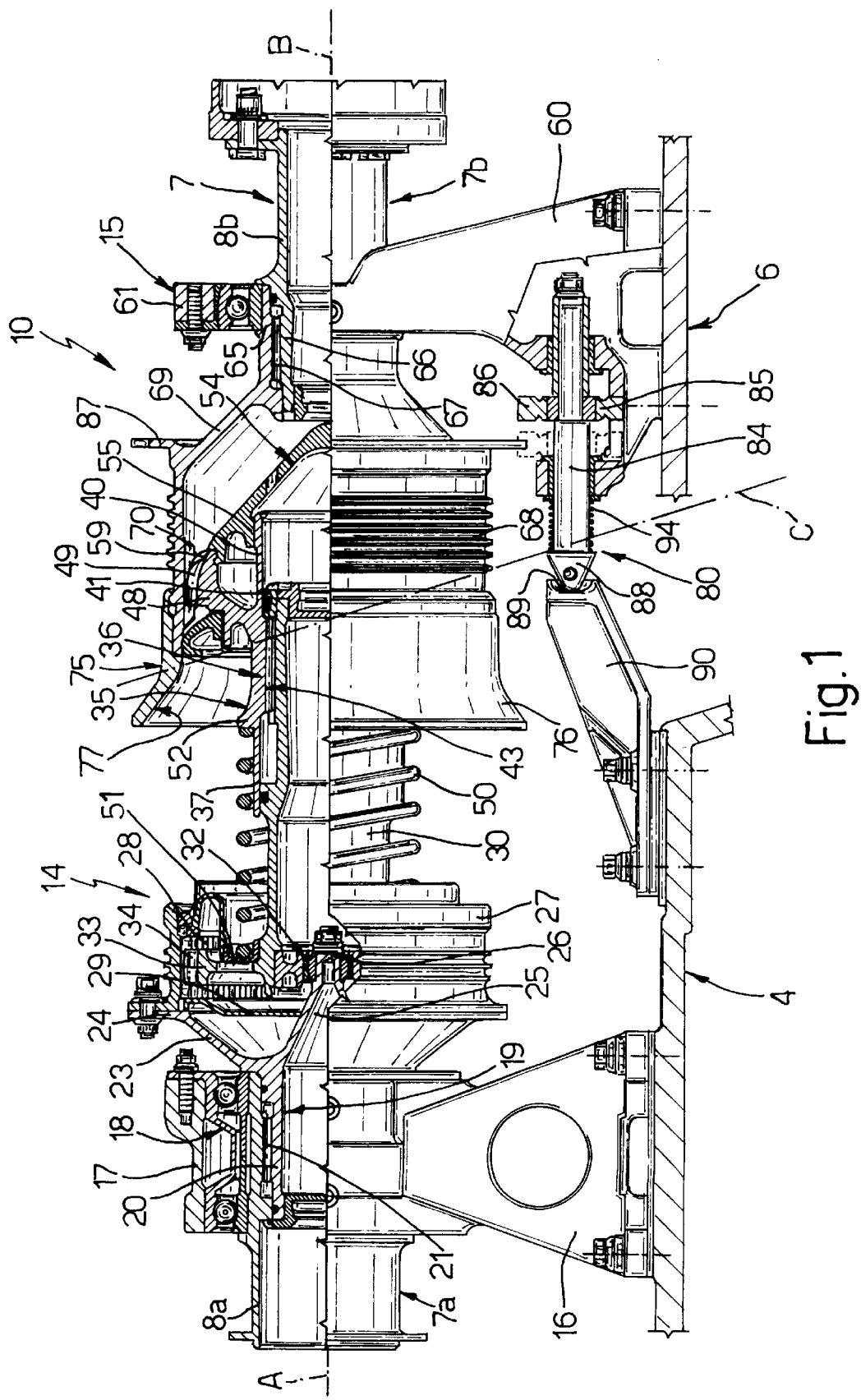
FIG. 1 shows a partially sectioned side view of a releasable coupling for a power transmission line to a tail rotor of a helicopter, in accordance with the teachings of the present invention.

Portions 7a, 7b are each defined by a number of hollow shafts 8a, 8b in series with one another. FIG. 1 only shows the rear end shaft 8a of portion 7a and the front end shaft 8b of portion 7b, between which, according to the present invention, a releasable coupling 10 is interposed.

Coupling 10 substantially comprises a first coupling assembly 14 (FIG. 2) connected to body 4, and a second coupling assembly 15 (FIG. 3) connected to tail section 6.

More specifically, first coupling assembly 14 comprises a support 16 connected rigidly to the structure of body 4 and integrally defining a tubular sleeve 17 of axis A, in which shaft 8a is supported and permitted to rotate by means of a double-row ball bearing 18.

First coupling assembly 14 also comprises a hub 19 having a tubular portion 20, which is internally coaxial with shaft 8a, is locked axially inside shaft 8a, and is connected rotationally to shaft 8a by a splined coupling 21. From one end of tubular portion 20, there extend integrally a flared flange 23 having a flat annular peripheral edge 24, and a substantially conical supporting portion 25 having a projecting pin 26 of axis A.

Flange 23 is closed at the front by a disk 29 substantially coplanar with edge 24 and having a central hole for the passage of supporting portion 25.

Edge 24 of flange 23 is fitted rigidly with a ring gear 27 having straight cylindrical inner teeth 28; and pin 26 is fitted with a projecting orientable hollow shaft 30 of axis D. More specifically, one end 31 of shaft 30 is connected to pin 26 by a spherical joint 32 with a center P along axis A; and axis D of shaft 30, in use coincident with axis A, may be offset with respect to axis A as shown (by the dot-and-dash lines) in FIG. 2.

A gear 33 extends integrally from end 31, is housed inside ring gear 27, and comprises straight (i.e. extending along radial planes) but convex peripheral teeth 34 with a spherical profile of center P, and which mesh with inner teeth 28 of ring gear 27 to rotationally connect shaft 30 to hub 19.

Shaft 30 is fitted in axially-sliding and angularly-integral manner with a transmission member 35 of axis D. More specifically, member 35 substantially comprises a sleeve 36 having a tubular first end 37 sliding on a cylindrical guide surface 38 defined by an intermediate annular projection 39 of shaft 30, and a tubular second end 40 sliding on a guide ring 41 fitted by a ring nut 95 to the end 42 of shaft 30 opposite end 31.

Sleeve 36 is connected angularly to shaft 30 by a splined coupling 43 interposed between shaft 30 and an intermediate portion 45 of sleeve 36; and coupling 43 is defined by helical teeth 46, 47 respectively inside sleeve 36 and outside shaft 30, and which slope slightly by a few degrees with respect to axis D of shaft 30.

Transmission member 35 also comprises a gear 48 extending integrally outwards from intermediate portion 45 of sleeve 36, and having radial straight (i.e. extending along radial planes) but arc-shaped teeth 49 with a convex, substantially barrel-shaped profile tapering on the side facing second end 40 of sleeve 36. Teeth 49 each have an end bevel 59 for assisting engagement as described clearly later on.

Sleeve 36 is normally maintained in a limit axial position (FIG. 2) defined by inner teeth 46 contacting guide ring 41, and by a helical spring 50 coaxial with shaft 30 and compressed between an outer intermediate shoulder 52 of sleeve 36 and an annular supporting element 51 fitted to shaft 30 and axially contacting gear 33.

First coupling assembly 14 also comprises at the end a substantially conical, convex male lead-in element 54 having a base portion 55 fitted to sleeve 36, and a lateral wall 56, which terminates in a rounded tip 57 facing tail section 6 and has a peripheral edge 58 butt connected to gear 48 and so formed as to substantially blend lateral wall 56 with a bottom surface of teeth 49 of gear 48.

Second coupling assembly 15 (FIG. 3) in turn comprises a supporting bracket 60 connected rigidly to the structure of tail section 6, and integrally defining an annular support 61 of axis B.

A second transmission member 64, rotationally integral with shaft 8b and interacting, in use, with first coupling assembly 14, is fitted orientably inside support 61 by means of a bush 62 and a rolling bearing 63 cooperating mutually by means of respective spherical contact surfaces.

More specifically, transmission member 64 comprises a hub 65, which is fitted inside bearing 63, supports one end 66 of shaft 8b, and is connected angularly to end 66 by a splined coupling 67; and a cylindrical ring gear 68 projecting axially from hub 65 towards body 4, and connected integrally to hub 65 by a conical flange 69.

Ring gear 68 comprises straight inner teeth 70, which are engaged, in use, by teeth 49 of gear 48 of first coupling assembly 14 (FIG. 1).

A free edge 74 of ring gear 68 is fitted with a second female lead-in element 75 having a flared truncated-cone-shaped wall 76 projecting beyond ring gear 68 and defined internally by a conical surface 77 which blends with an inner surface 79 of ring gear 68.

First and second lead-in elements 54 and 75 are conveniently made of plastic material.

Coupling 10 also comprises a device 80 for locking tail rotor 5 when tail section 6 is folded.

Device 80 substantially comprises a rod 84 having an axis parallel to axis B, and which is fitted in axially-sliding manner to bracket 60 of second coupling assembly 15. Rod 84 is fitted, in an intermediate position, with an engaging member 85 having a projection 86 which cooperates with a toothed disk 87, integral with ring gear 68, to prevent the disk from rotating. At the end facing body 4 in use, rod 84 comprises a push member 88, which cooperates with a mating surface 89 on a stop member 90 fitted rigidly to body 4.

Figure 3:
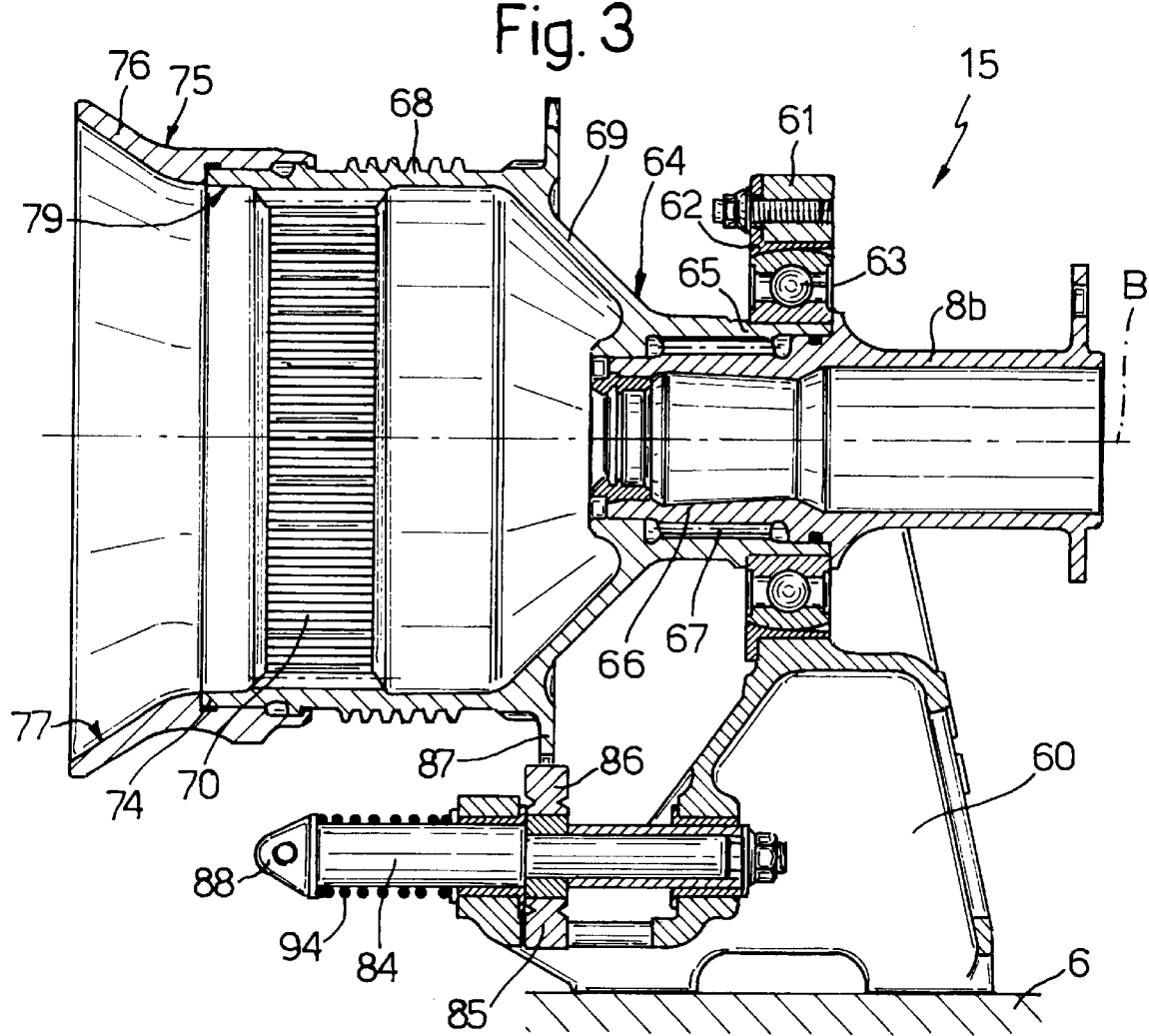
FIG. 3 shows a larger-scale axial section of a second coupling assembly of the FIG. 1 coupling.

A spring 94, compressed between bracket 60 and push member 88, draws rod 84 into the axial stop position shown in FIG. 3 (and by the dash line in FIG. 1) in which projection 86 interacts with and engages a gap between the teeth of disk 87 to prevent the disk from rotating and so lock shaft 8b, integral with the disk, and tail rotor 5.

Coupling 10 operates as follows.

FIG. 1 shows the work position of coupling 10 rotationally connecting portion 7a to portion 7b of transmission line 7 to the tail rotor.

More specifically, torque is transmitted from shaft 8a via splined coupling 21 to hub 19, and from hub 19 to shaft 30 via ring gear 27 and gear 33; and transmission member 35 is driven by shaft 30 via splined coupling 43.

Gear 48 of transmission member 35, which is maintained in the limit position by spring 50, meshes with teeth 70 of ring gear 68 of transmission member 64, which in turn is angularly integral with shaft 8b.

In the above configuration of coupling 10, device 80 for locking the tail rotor is deactivated; and stop member 90 cooperates with push member 88, in opposition to spring 94, to keep rod 84 in a withdrawn position in which engaging member 85 (shown by the continuous line in FIG. 1) is detached from disk 87.

When tail section 6 is folded, rotation of the tail section about axis C produces a telescopic or withdrawal movement, along a substantially circular trajectory, of transmission member 35 of first coupling assembly 14 with respect to transmission member 64 of the second coupling assembly. This is made possible by transmission member 35 of first coupling assembly 14 being orientable with respect to support 16, in particular by virtue of spherical joint 32 of shaft 30 to which transmission member 35 is fitted coaxially, and by virtue of the curved profile of teeth 34 and 49.

When tail section 6 is rotated about axis C, device 80 for locking the tail rotor is operated before teeth 70 of ring gear 68 are released from teeth 49 of gear 48, and therefore before portions 7a and 7b of the transmission line to the tail rotor are disconnected. That is, stop member 90 allows rod 84 to be moved by spring 94 into the axial stop position shown in FIG. 3 (and by the dash line in FIG. 1) in which projection 86 interacts with the teeth of disk 87.

Figure 2:
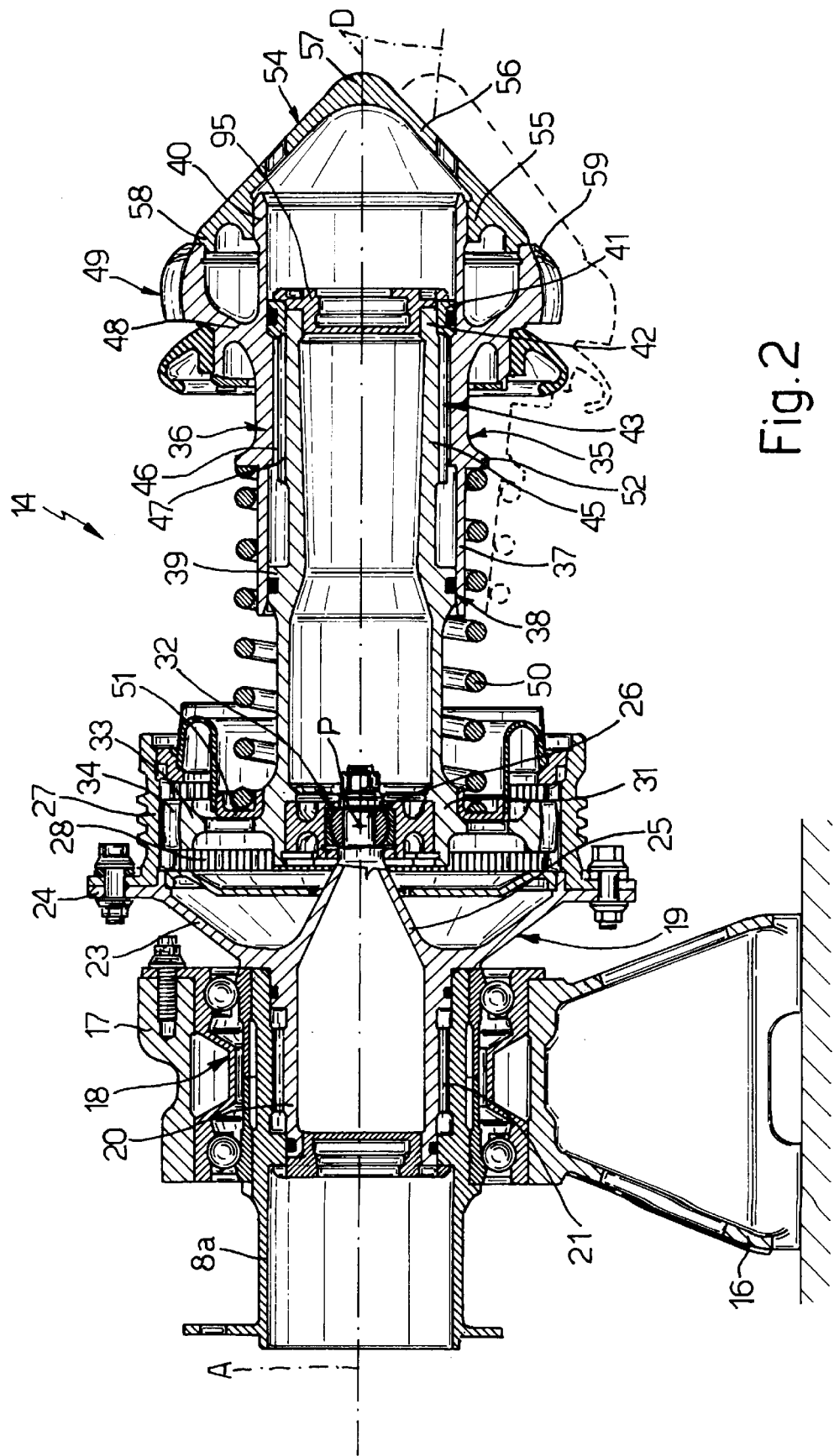
FIG. 2 shows a larger-scale axial section of a first coupling assembly of the FIG. 1 coupling.

When coupling assemblies 14 and 15 are fully released, assembly 14 assumes the configuration shown partly by the dash line in FIG. 2, in which shaft 30 and transmission member 35 slope downwards under their own weight in a stop position in which teeth 28 of gear 27 rest on disk 29.

When the tail section is set to the work position, initial contact between coupling assemblies 14 and 15 occurs between respective lead-in elements 54 and 75, the conical shape of which provides for centering first and second transmission members 35 and 64.

Only later are gear 48 and ring gear 68 brought into contact with each other; the engagement of respective teeth 49 and 70, cooperating telescopically with each other, being assisted by front bevels 59 of teeth 49. If the relative angular position of teeth 49 and 70 is such that teeth 49 frontally contact teeth 70, spring 50 is compressed elastically to absorb the impact, by transmission member 35 sliding axially along shaft 30, and so prevent damaging the teeth. On account of the helical shape of splined coupling 43 between transmission member 35 and shaft 30, member 35, as it slides axially, is rotated sufficiently to offset and so telescopically engage teeth 49 and 70. Spring 50 may thus restore member 35 to the limit position and ensure, in use, sufficient elastic pressure on member 35 to keep it safely coupled with second transmission member 64.

The advantages of coupling 10 according to the teachings of the present invention will be clear from the foregoing description.

In particular, using radial teeth 49, 70 provides for reliable engagement of coupling assemblies 14 and 15 in any flight conditions; while teeth 49, 70 and orientable assembly of the transmission member 35 provide for compensating any misalignment of portions 7a and 7b of transmission line 7 to the tail rotor.

Finally, elastic axial support of transmission member 35 by spring 50 provides for safely absorbing any impact between teeth 49, 70 during engagement.

Clearly, changes may be made to coupling 10 as described and illustrated herein without, however, departing from the scope of the present invention.

I claim:

1. A releasable coupling for a power transmission line to a tail rotor of a helicopter having a body and a tail section movable, with respect to said body, between a work position and a folded position; said coupling comprising a first coupling assembly including a first support rigidly connected to said body of the helicopter and a first transmission member drivingly connected to a first portion of said transmission line, and a second coupling assembly including a second support rigidly connected to said tail section of the helicopter and a second transmission member drivingly connected to a second portion of said transmission line; the two coupling assemblies cooperating with each other when said tail section is in said work position and released when said tail section is in said folded position, said first and second transmission members having respective radial toothings meshing with each other in said work position of said tail section; and cooperating telescopically with each other; said coupling comprising orientable supporting means interposed between at least one of said supports and a corresponding one of said transmission members; and said coupling assemblies comprising lead-in means which are brought into contact with each other prior to the respective toothings to guide connection of the transmission members.

2. A coupling as claimed in claim 1, wherein at least one of said toothings has arc-shaped profiles enabling misalignment between transmission members.

3. A coupling as claimed in claim 1, wherein said lead-in means comprise a substantially conical male first lead-in member extending from one end of one of said transmission members; and a female second lead-in member extending from another of said transmission members and having a substantially conical lateral wall which cooperates with said first lead-in member.

4. A coupling as claimed in claim 3, wherein said lead-in members are made of plastic material.

5. A coupling as claimed in any one of the foregoing claims, wherein said first coupling assembly comprises elastic axial supporting means for axially supporting said first transmission member.

6. A coupling as claimed in claim 5, wherein said first coupling assembly comprises a hub drivingly connected angularly to said first portion of said transmission line; said orientable supporting means being interposed between said hub and said first transmission member.

7. A coupling as claimed in claim 6, wherein said orientable supporting means comprise a spherical joint.

8. A coupling as claimed in claim 7, wherein said orientable supporting means comprise a shaft connected to said hub by said spherical joint; said first transmission member being mounted to slide axially on said shaft; and said elastic axial supporting means being interposed between said first transmission member and said shaft.

9. A coupling as claimed in claim 8, comprising first angular connecting means interposed between said hub and said shaft; and second angular connecting means interposed between said shaft and said first transmission member.

10. A coupling as claimed in claim 9, wherein said second angular connecting means comprise a helical-toothed splined coupling.

* * * * *